United States Patent [19]

Zimmermann et al.

[11] 4,251,156
[45] Feb. 17, 1981

[54] METHOD OF AND APPARATUS FOR MAKING PHOTOGRAPHIC PRINTS

[75] Inventors: Franz Zimmermann, Meggen; Karl Ursprung, Niederhasli, both of Switzerland

[73] Assignee: Gretag Aktiengesellschaft, Regensdorf, Switzerland

[21] Appl. No.: 64,574

[22] Filed: Aug. 7, 1979

[30] Foreign Application Priority Data

Aug. 17, 1978 [CH] Switzerland .................. 8765/78

[51] Int. Cl.³ ............................................ G03B 27/52
[52] U.S. Cl. ................................... 355/41; 355/64; 355/77
[58] Field of Search ................ 355/13, 28, 29, 32, 355/38, 41, 64, 77

[56] References Cited

U.S. PATENT DOCUMENTS

| | | | |
|---|---|---|---|
| 3,516,741 | 6/1970 | Thaddey ........................ | 355/41 X |
| 3,768,903 | 10/1973 | Steinberger et al. ............ | 355/38 |
| 3,829,214 | 8/1974 | Zahn et al. .................... | 355/38 X |

*Primary Examiner*—Richard A. Wintercorn
*Attorney, Agent, or Firm*—Burns, Doane, Swecker & Mathis

[57] ABSTRACT

A reel of film is printed automatically in a printer to which reel identification, data etc., are fed on a basic data support. Each frame is counted as it passes through the printer and an address consisting of the result of the count and the reel identification data is applied to the print. After visual assessment of the first prints, a correction programme tape is produced with addresses and correction data of the defectively-printed frames and then the printing of these frames is automatically repeated by means of the programme tape. This operation is repeated as required. The programme tape and the film reel are then filed, the first and the repeat prints are sent to the customer who may then compile his reprint order from the addresses shown on the prints. A new programme tape is prepared in the laboratory from the filed programme tape and the reprint order information and the printer is controlled by means of the programme tape in order to carry out the reprint order. The originally-filled tape and the film reel are then returned to the file, and the programme tape specific to that order is destroyed.

12 Claims, 2 Drawing Figures

METHOD OF AND APPARATUS FOR MAKING PHOTOGRAPHIC PRINTS

FIELD OF THE INVENTION

This invention relates to a method of, and apparatus for, the production of photographic prints from individual films or film strips which are combined to form a longer strip which is rolled up to form a reel. More particularly, the invention relates to the production of reprints.

The term "reprints" is used to denote orders given by a customer after he has already had the original photographic prints from the original negative. This is in contrast to the original order in which the amateur photographer generally orders a copy of each printable negative "sight unseen" as it were.

The general procedure for giving reprint orders is for the amateur photographer to receive his original order back from the processing laboratory with both the film and the prints made therefrom, the film normally being cut up into short strips containing from four to six negatives. To order the reprints the photographer notes down the number of the negative of which he wants additional prints, either on an order slip or an order wallet, together with the number of such prints and the size required. He then returns the film strip and the reprint order to the processing laboratory, where the orders are sorted and usually printed manually by skilled operators. In contrast with the original automatic run, this process is slow and labour-intensive and hence expensive.

Apart from these purely private orders, there is a category of orders intended for a wider number of people and in order to distinguish such orders they will hereinafter be referred to as combined or collective orders to denote orders in which a number of people are interested in having prints from the same negative. Situations of this kind occur for example, in connection with souvenir photographs of public events, company celebrations, anniversaries, inauguration ceremonies, family occasions, school and college graduation ceremonies, and so on. In such cases, the photography is usually entrusted to a professional photographer or a competent amateur who, in his original order, will have proofs made which he then gives out or passes round and for which he takes orders for reprints from the participants and other interested parties. He therefore acts as an agent to have the reprints made, the film remaining in his possession. Large quantities of prints are usually required per photograph. As far as the processing laboratory is concerned, an order of this kind is carried out in the same way as a private individual order.

PRIOR ART

For the more rational execution of reprint orders, systems have been designed which simplify the handling of the film strips in the laboratory.

In a simplified version, the film strips of an order are secured at the side to a long paper support strip in an arbitrary sequence. The quantity of reprints ordered is noted on the support strip immediately adjacent the original. A large number of orders can be combined to form a long strip in this way and be rolled up to form a reel. Printing is then restricted to passing this reel through a printer and positioning in the exposure station each original of which reprints are required, reading off the quantity from the support strip and transferring this information to the printer. The exposure data for each original is determined by the printer measuring system itself. In an extended version of this system, information concerning density and colour corrections can also be transferred to the printer in addition to the quantities required on printing.

In another system, the film strips of an order are secured at the side to a long support strip in any arbitrary sequence. The first negative number of each strip and the number of negatives contained in the strip are inserted on the keyboard of a VDU terminal whereupon all the negative numbers of the film strip concerned appear in ascending sequence on the VDU. The quantity required can be associated with each negative by means of the keyboard. Negatives of which no prints are required are assigned the numeral 0. This procedure is repeated for all the strips in an order. At the end of the order the information is transferred from the VDU to a punched tape, but the numbers of the negative are not transferred; instead just the quantity associated with each negative of the order is transferred in the sequence in which the negatives occur within the order. In an extended version of this system, other information, such as density and colour corrections, can be inputed in addition to the quantity and be transferred to the punched tape. The printing operation is carried out fully automatically, the punched tape as the control element and the reel with the film strips or individual orders having been previously synchronised.

Although these reprint order systems contribute to more rational operation in the processing laboratory, they do not exhaust the possibilities for rationalisation and the advantages particular in the case of collective orders, in which the film reel has to be cut into strips after the first pass, the strip together with the prints have to be returned to the customer, and the new order sent to the processing laboratory entails the strips or film portions being cemented together to form a reel according to one of the said processes, and then cut again, these being dead-time operations which are thus uneconomic and also make it difficult to expedite the execution of reprint orders.

The known reprint order systems do not solve one problem which arises in connection with the use of miniature film (135 film). Here, of course, there is no clear relationship between the film perforation and the position of the individual frames, because the film transport length depends upon the camera and its correct operation. As a precaution, the film manufacturers apply frame numbering to the edge of the film during its manufacture, and this is done in line with the standard graduation of 8 perforations per frame (24×36 mm) and the half-frame (24×18 mm) size is taken into account by dividing the frames additionally into an A and a B half, so that the numbering on the film runs 1A, 1B, 2A, 2B, 3A, and so on. If the camera feed differs from the standard, there are shifts between the position of the frames and the corresponding numbering. Amateur photographers are therefore often uncertain as to what number at the film edge should be associated with a specific negative when re-ordering.

DAS No. 12 60 295 and the corresponding U.S. Pat. Nos. 3,454,336 and 3,576,369 describe a process for the production of repeat prints wherein films provided with a sensing mark on the printable frames are passed through a printer, the film advance steps being automatically counted and place numbers of the printed originals being indicated on the back of the prints, and wherein a programme support is made as a correction strip after inspection of the prints which have been produced, the correction strip containing the place number of the original in the film strip and details of the exposure corrections required. The details on the programme support can be transferred manually or automatically to the printer for the production of the repeat prints.

In this method, the programme support is used only once for making the repeat prints. It is not intended for use in a re-ordering system nor is it filed for later use any more than is the film reel.

DOS No. 25 18 580 and the corresponding G.B. Pat. No. 1,456,178 describe an ordering system in which the client's order is first transferred from the order wallet or order slip to a first store, the information comprising the negative number on a negative film and the required number of prints, and wherein a reference position is determined on the negative film to serve as a basis for the negative numbers in the first store, the new negative numbers together with the quantity required being retained in a second store and being used to control the subsequent printing process.

With this system, the customer returns the associated film (cut up into strips) to the processing laboratory together with his order. The order information concerns the numbers of the negatives applied by the manufacturers. The order first has to be re-written in the laboratory.

Other prior art specifications are Swiss Patent specification No. 416 323 and DOS No. 26 40 453 which in no way suggest the teaching of this invention.

OBJECTS OF THE INVENTION

It is an object of this invention to simplify the execution of reprint orders and hence make the procedure more economic.

It is another object of the invention to expedite the execution of reprint orders. An additional object of the invention is to protect the original films from unnecessary handling and hence damage or risk of loss.

Another object of the invention is to facilitate the customer's work in making out his reprint order, by clearly associating a single order number with each print without reference to the film frame numbering.

Another object of the invention is to ensure constant quality of results in the case of reprint orders given at different times for the same original.

SUMMARY OF THE INVENTION

The invention starts from a method of processing photographic prints from a reel of film, a first print being made of all the printable frames in an automatic printer, the first print is visually assessed, and a repeat print is produced from the unsatisfactory prints after a programme support has been made which is provided with the correction data and which is used to control the production of the repeat print, and is characterised in that address information is formed, for example by inputting a reel identification code and counting the individual frames during passage through the printer, and this address information is applied to the first prints and to the repeat prints, so that a clear association is obtained between each frame and its print, and for the production of reprints another specific order programme support is made from the information contained in the original programme support and additional information relating to the addresses, quantities, and any corrections of the reprints required, and the reprints are automatically produced in the printer by means of this specific order programme support.

BRIEF DESCRIPTION OF THE DRAWINGS

The invention is explained in detail below with reference to FIGS. 1 and 2 which are each a flow diagram of the individual steps in the process for the production of first prints and reprints respectively.

DETAILED DESCRIPTION OF PREFERRED EMBODIMENT

Figure 1:
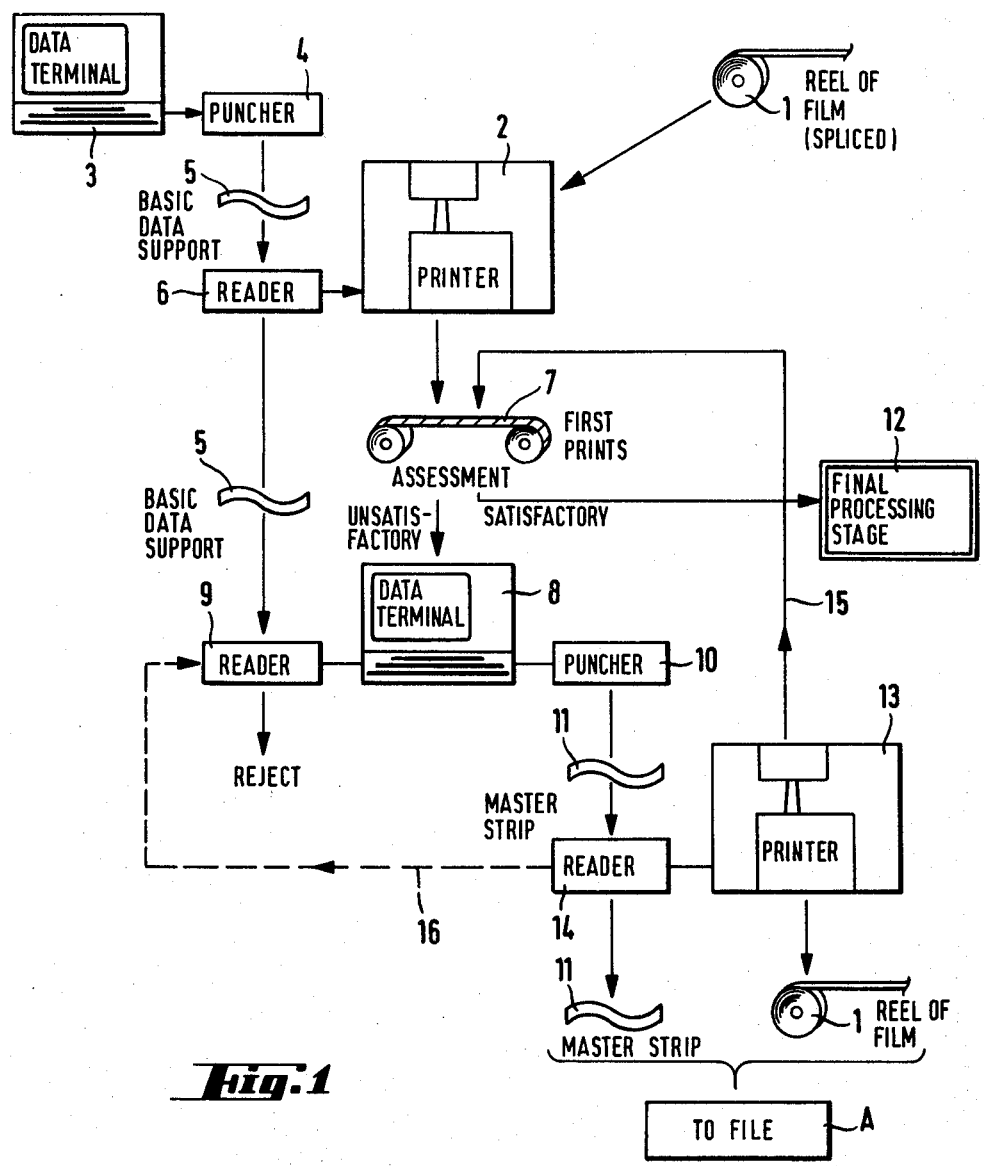

The negative films sent in by customers are first conventionally spliced and rolled. The joints between the individual orders are appropriately marked and given serial numbers for example. Except in the case of Instamatic films or the like, the reel of film 1 is then fed to a notcher which notches each frame laterally.

Before the film is fed to an automatic printer 2 a basic data support 5 in the form of a punched tape or magnetic tape or the like is produced by means of a suitable data terminal 3 (with a tape puncher 4). The basic data support contains an identification number for the reel of film in question, the serial number of the first order on the reel, and details of the type of film material in the reel. This basic information is then fed on the basic data support 5 to the automatic printer 2, which may, for example, be Applicants' Colorprinter 3140, together with the reel of film 1.

In the printer 2 the individual frames of the reel 1 are photo-electrically analysed step-by-step in order to determine their printability and, where applicable, the correct exposure data, and then printed, provided that they are printable. At the same time, the individual frames are counted starting from an arbitrary reference point. The reference point is the start of the film, i.e. the first frame of the first order, or, preferably, the start of each order. The printer has means whereby a numeric or alphanumeric address is formed from the position number of each frame in the reel, (this number being obtained by counting the frames) and from the reel identification contained in the basic information (by means of reader 6), the print of each frame then being exposed to the address (if counting is carried out from the joint between each order, the orders must also be counted and be included in the address formation process. The address formation and exposure may be carried out as described, for example, in U.S. Pat. Nos. 3,454,336 and 3,576,369, and are therefore not described in detail here.

The first prints 7 produced during this first pass through the printer 2 are then assessed visually after development. Prints which are found satisfactory are fed to the conventional final processing stage 12.

If some of the first prints require correction, a programme support 11 is produced by means of a data terminal 8 having a reader 9 and puncher 10. This programme support takes over the basic data from the basic data support 5 and also contains the addresses of those frames of which the first print 7 is considered to require correction, and the associated exposure corrections. The basic data is transferred at terminal 8 automatically in known manner while the addresses and correction data are inputed manually.

The basic data support is now superfluous and is destroyed.

The reel of film 1 is then fed to the same printer a second time or to a second printer 13 with a reader 14. The programme support 11 is also fed to the printer and controls the same by automatically positioning each frame whose first print 7 was faulty, and printing it with the input exposure corrections. The addresses of the frames concerned are also exposed onto the repeat prints. The unsatisfactory first prints 7 are then replaced by the finally processed improved prints so that there is then a complete set of prints available.

If the repeat prints are also not completely satisfactory, the entire operation can be repeated. In that case a new programme support 11 is produced which combines the information in the first produced programme support 11 together with the addresses and corrections obtained from the re-inspection (lines 15 and 16).

This operation of inspecting the repeat prints, maing a new programme support, and making new repeat prints, can be repeated until there is a satisfactory print of each printable frame; usually, however, one or two repeat passes will be sufficient. The final programme support will contain the above-described basic information in respect of the reel of film together with the addresses and definitive correction data of all those frames which were not printed satisfactorily during the first pass. This final programme support 11 which will hereinafter be referred to as the master strip, can then be used to control the printer so that all the frames can be satisfactorily printed in one operation.

The master strip 11 is then filed together with the associated reel of film 1 (FILE A). The reel thus stays in the processing laboratory and, unlike most systems known heretofore, is not cut up and returned to the customer who receives only the prints.

To obtain reprints, the customer gives the processing laboratory the number or addresses printed on the prints, together with the quantities and any corrections required.

Figure 2:
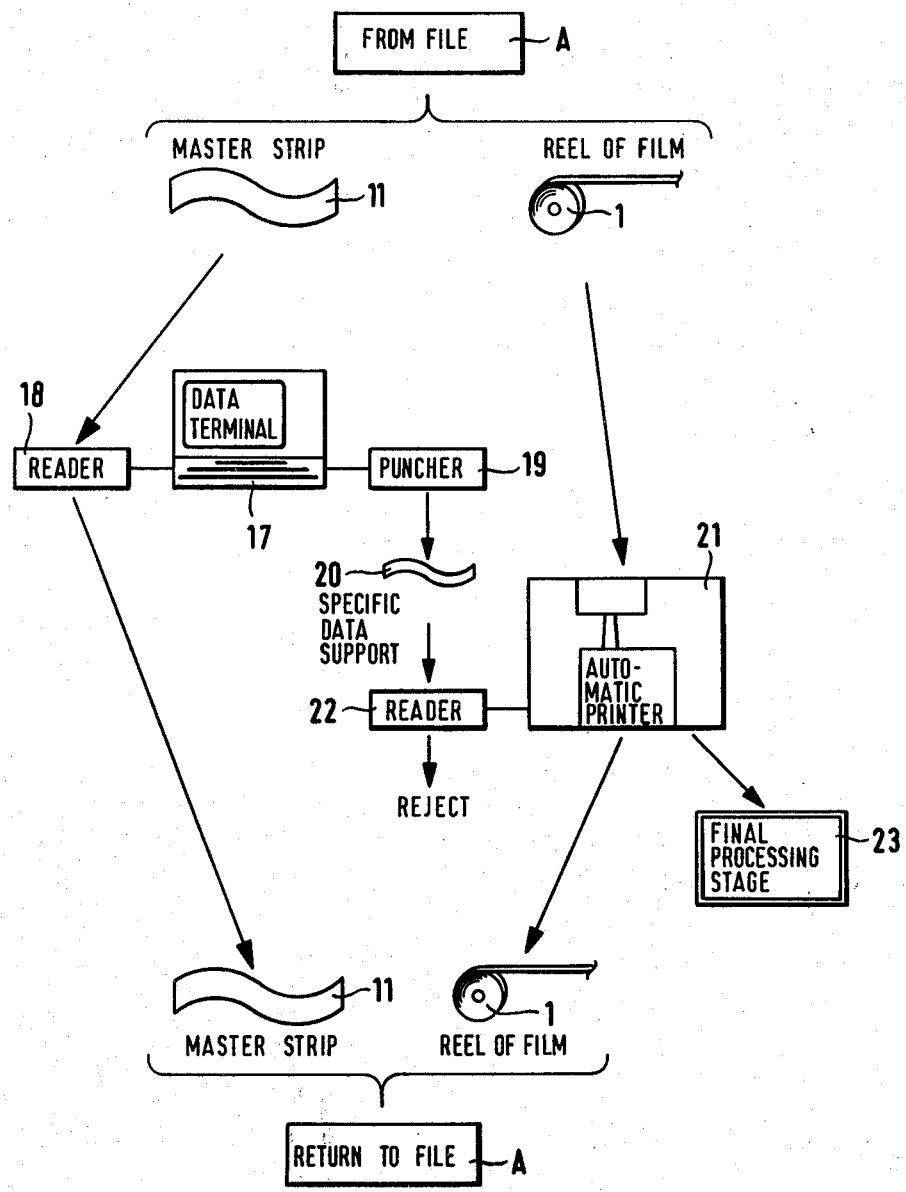

In the laboratory the reprint order is sorted with the numbers (addresses) in ascending order and fed to a data terminal 17 with a reader 18 and a puncher 19. (See FIG. 2). The data from the master strip 11 (which contains the addresses and corrections in respect of the repeat prints) are also fed to the same terminal, whereupon the terminal 17 produces another data support 20 specific to this order, this support containing the combined data from the reprint order and from the master strip.

The reel of film 1 and the specific order data support 20 are fed to an automatic printer 21 with a reader 22 which, in response to the data on support 20, positions the programmed frames and exposes them to produce the required number of prints, taking into account any correction data specified by the laboratory or the customer (in respect of density and/or colour), the prints being fed to a final processing stage 23. During this pass the transfer of any address information to the prints is usually dispensed with.

On conclusion of the printing operation, the reel of film 1 together with the master strip 11 is returned to the File A, the specific order data support is destroyed or its data erased. The prints are then sent to the customer. If required, he can order further reprints in exactly the same way, the order being processed similarly.

The expenditure in making the repeat prints alone is reduced since the corrections required are readily programmable by transferring the address from the print and inserting correction data. Unlike conventional methods, the reel of film does not need to be handled manually and is protected against the usual risk of loss, damage or dirt because it remains permanently on the reel.

Once satisfactory repeat prints have been made where necessary, the corresponding optimum correction data is stored for further use together with the film reel. Thus good prints without any repeats being necessary can be expected in one operation for reprint orders. This is attractive since it reduces waste and expedites orders, making the operation more competitive.

The printing operation can be carried out on high output automatic printers in the same way as for a first printing operation, the advantages of modern print analysis, high stability and rapid processing being important factors.

There is no need to assess the printability of the frames of a reel prior to the first printing operation, or to mark them appropriately. This operation can be left to the automatic printer, which counts, but does not print, the unprintable frames, whose positions are marked. The corresponding addresses are simply left out of the reel and cannot therefore become a problem.

The fact that each print is distinguished by a single number (address) obviates any doubt in the mind of an amateur photographer as to what number should be associated with a specific print.

As far as the customer is concerned, reprint ordering is limited simply to communicating characters and digits, and this can easily be done on the telephone or by telex. No time is taken up in sending off film strips, nor is any preparation required in the laboratory for automatic processing.

Finally, the customer knows that orders given at different times will be carried out always with the same quality.

The basic concept of the invention allows a number of variants which may be of interest depending upon the application.

For example, different media may be used as data supports. Punched tape and magnetic tape cassettes will be the primary supports although it would be possible technically to use, for example, magnetic discs (floppy discs). It would even be feasible to use core memory stages of a large computer, in which case filling would be divided up into a film reel file and a data file.

There are various possibilities for marking the addresses of the individual frames. The simplest is to count all the frames from the start of the film and number them in sequence. It has the disadvantage that any error in counting will be propagated over all the following frames.

A better method is to count separately the joins between two orders and the frames per order so that the address of each frame is based primarily on the distance from the immediately-preceding join and secondarily on the number of preceding joins up to the start of the reel of film. Any counting error within an order is then corrected in the next order.

Since short and long orders generally occur in an arbitrary sequence, the latter system provides a better possibility of detecting an error. Safety features can be incorporated. For example, the length (number of frames) of each order can be recorded on the master strip and the specific order data support and during the printing operation a check can be made to ensure that this number coincides with the number of processed frames per order.

Other possible checks are the incorporation of blank orders in the reel of film and similar steps.

The addresses can be applied to the prints in various ways. It is very advantageous to expose them onto the picture side, i.e. on an edge strip. This may be within the conventional printing size for example. Alternatively, the paper size can be increased somewhat to provide an additional edge situated outside the picture format.

For organisational and other reasons it may be advantageous to mark at least one copy of each reprint order with the associated addresses. This would simplify or facilitate matters, for example, at the final processing stage (sorting, packing, etc.,) of the prints.

We claim:

1. A method of making photographic prints from a reel of film containing a plurality of individual frames comprising the steps of:
   (a) passing said film through an automatic printer;
   (b) counting the individual frames of said film during passage through said printer;
   (c) forming from said film count an address for each frame;
   (d) producing first prints of said frames as said film is passed through said printer and applying to each print the address associated therewith;
   (e) assessing each of the first prints produced by said printer for acceptability;
   (f) forming a program support containing the addresses of those frames producing unacceptable prints and information of the corrections required to make said unacceptable prints acceptable;
   (g) passing said film a second time through said printer under control of said program support to produce repeat prints of the addressed frames with the required corrections and applying to the repeat prints their respective addresses;
   (h) forming a specific order program support from the information contained in the program support and additional specific order information relating to frame addresses, number of reprints to be made and corrections to be made when reprints are to be produced; and
   (i) passing said film through said printer under the control of said specific order program support to produce reprints according to the order.

2. A process according to claim 1, including before producing the first prints, making a basic data support which contains a film reel identification code and, where applicable, information concerning orders on the reel and types of film material, and each time repeat prints are to be produced making a programme support which includes the information from the basic data support combined with the frame addresses and information relating to exposure corrections to provide a definitive form of the programme support containing the information from the basic data support and all the necessary correction data for producing satisfactory copies of all the frames after the last repeat print passes through said printer.

3. A process for the production of photographic prints from individual films or film strips grouped by order to form a long film strip and rolled up to form a reel of film, the joints between the individual orders being marked and at least the printable frames having marks which can be machine-read on the film strip, such marks preferably being in the form of edge notches or perforations, the process including photo-electrically analysing individual frames of the film strip to determine their printability and the correct exposure data, feeding said frames step-by-step in an automatic printer to make a first print from each printable frame, counting the frames from at least one reference point on the strip, applying to the first print an address which indicates the position of the frame in question in relation to the reference point, visually assessing the first prints and making a programme support containing information concerning the address of the first prints which are considered to require correction, and the exposure corrections required, and producing a repeat print in an automatic printer under control of the information on the programme support in respect of all those frames of which the first print was regarded as requiring correction, the repeat print replacing the first print of the frame in question; wherein the basic information concerning the reel of film and, where applicable, in respect of the individual orders within the reel of film, is fed on a basic data support to the automatic printer together with the reel of film, the basic information on the basic data support is transferred to the programme support when the programme support is made on visual assessment of the first prints, the repeat prints are also assessed visually and, where applicable, another repeat print is produced of those frames of which the repeat print is considered to require correction, a new programme support being made, and this process is repeated until the result is satisfactory, the information from the immediately-preceding programme support being transferred whenever a new programme support is made and being combined with the additional new information, the addresses applied to the first prints and any repeat prints are formed from the position information of the frames with respect to at least one reference point and the basic information on the basic data support, so that there is a clear relationship between each first and repeat print and the film reel and a frame thereon, for the production of reprints, another programme support specific to a particular order is made from the preceding programme support from the last pass for the production of the repeat prints and from the addresses on the first and repeat prints, and from the quantities in respect of those frames of which reprints are required, and where applicable further correction data, said programme support is fed to an automatic printer together with the film reel, and the required number of reprints is produced from each required frame in the automatic printer by reference to the information on the specific-order data support.

4. A process according to claim 3, wherein no addresses are applied to the reprints.

5. A process according to claim 3, wherein the address is applied to one reprint of each frame for which a reprint is required, per reprint order.

6. A process according to claim 3, wherein the address is exposed onto the picture side of the prints.

7. A process according to claim 6, wherein the address is exposed onto an edge strip of the prints within the original print format.

8. A process according to claim 6, wherein the print format is enlarged beyond the original format and the address is exposed onto an edge strip of the prints produced by such enlargement.

9. A process according to claim 3, wherein the frames are counted in each case from the joints between the individual orders on the reel, the orders or joints are also counted, and the addresses are formed from the results of these two counts.

10. A process according to claim 3, wherein the basic information of the first data support is formed from an identification code for the film reel, the number of the first order on the reel, and, if desired, a film type identification code.

11. Apparatus for making photographic prints from a reel of film containing a plurality of individual frames, comprising:

means including an input terminal for producing a program support containing information relating to a reel of film; and an automatic printer for making photographic prints of the individual frames onto print material, said printer including means for counting the frames for printing on a reel of film and means controllable by said counting means and by a program support for applying address information to the print material.

12. The apparatus of claim 11 wherein said means for applying address information exposes the information onto the print material.

* * * * *